United States Patent
Shimizu

[11] 3,774,991
[45] Nov. 27, 1973

[54] ACHROMATIC TELEPHOTO OBJECTIVE LENS

[75] Inventor: Yoshiyuki Shimizu, Kawasaki, Japan

[73] Assignee: Nippon Kogaku K.K., Tokyo, Japan

[22] Filed: Dec. 20, 1971

[21] Appl. No.: 209,617

[30] Foreign Application Priority Data
Dec. 25, 1970 Japan.............................. 45/125634

[52] U.S. Cl.................. 350/215, 350/177, 350/220
[51] Int. Cl...... G02b 9/34, G02b 9/62, G02b 13/02
[58] Field of Search..................... 350/215, 177, 220

[56] References Cited
UNITED STATES PATENTS

| | | | |
|---|---|---|---|
| 3,395,962 | 8/1968 | Herzberger et al. | 350/215 |
| 2,850,945 | 9/1958 | Kohler | 350/177 |
| 3,249,009 | 5/1966 | Lescher et al. | 350/177 |
| 3,502,394 | 3/1970 | Kobayashi | 350/216 |

*Primary Examiner*—John K. Corbin
*Attorney*—Joseph M. Fitzpatrick et al.

[57] ABSTRACT

An achromatic objective lens comprises three to five components, of which at least two are positive and at least one is negative. At least one of the positive components is formed of fluophosphate crown glass or phosphate crown glass. At least one of the other positive components is formed of barium flint glass. At least one of the negative components is formed of lanthanum glass or antimony flint glass.

6 Claims, 24 Drawing Figures

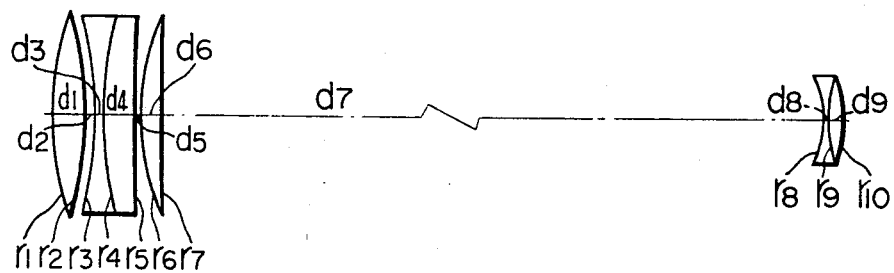

SPHERICAL ABERRATION ———
SINE CONDITION - - -

ASTIGMATISM

DISTORSION

SPHERICAL ABERRATION ———
SINE CONDITION -----

ASTIGMATISM

DISTORSION

SPHERICAL ABERRATION SINE CONDITION

ASTIGMATISM

DISTORSION

ACHROMATIC TELEPHOTO OBJECTIVE LENS

BACKGROUND OF THE INVENTION

1. Field of the Invention

This invention relates to an achromatic objective lens suitable for photography, or the like.

2. Description of the Prior Art

If a thin composite lens system, comprising simply of two lenses joined together, is made so as to be achromatic for light having a wavelength $\mu g$ for $g$-line of the spectrum with respect to light of a wavelength $\mu d$ for $d$-line of the spectrum as reference wavelength (see FIG. 6), then the focal length $f_c$ of the lens system for a third wavelength $\mu c$ and $c$-line of the spectrum will be expressed as:

$$\Delta f_c \approx f_c - f_d \approx -[(k_1 - f_2)/(\nu_{g_1} - \nu_{g_2})]f_d = Df_d \quad (1)$$

where $f_d$ represents the focal length for the reference wavelength $d$ $\nu_g = (n_d - 1)/(n_g - n_d)$, $k = (n_c - n_d)/(n_g - n_d)$, $n_d$, $n_g$ and $n_c$ represent the refractive indices for the wavelengths $\mu d$, $\mu g$ and $\mu c$, and the subscript numbers 1 and 2 relate to positive and negative lenses, respectively, $\Delta f_c$ is the so-called secondary spectrum.

The value of D may be variable depending on such factors as the glass in use and the wavelengths in use, but since in ordinary glasses the values of $\nu g$ and $k$ are substantially proportional to each other, the numerator in equation 1 does not become zero. Thus, the equation shows that achromatism for three different wavelengths is impossible with an achromatic lens formed of two glass components.

For example, a combination of glass components which can show sufficiently different dispersive powers for $d$-line, $g$-line and $c$-line of the spectrum will usually provide a substantially constant value of approximately $-1/1,000$. Therefore, if an achromatic lens for photography is made achromatic for $d$-line and $g$-line, its focal length for $c$-line will be increased by about 0.1 percent, which is not a negligible value in an optical system of great focal length used for precision measurements. In order to reduce this value, it is preferable, as seen from equation 1, that the glass, for the positive component, has a smaller value of $k$ while the glass for the negative component has a greater value of $k$. This will reduce the numerator of equation 1 and decrease the value of D. Ideally, the values of $k$ in the positive and negative lenses should be such that $k_1 = k_2$, which establishes achromatism for three different wavelengths.

Further, the glass for the positive component should desirably have a large value of $\nu_g$, i.e. a low dispersive power, while the glass for the negative component should have a small value of $\nu_g$, i.e. a high dispersive power.

This increases the denominator in equation 1 and decreases the value of D. As mentioned previously, however, in the optical glasses usually used, values of $\nu_g$ and $k$ are substantially proportionate to each other and consequently, the value of D maintains a substantially constant level. Thus, it is difficult to find a desired glass. For this reason, materials other than glasses, such as quartzite, have been used as a material for reducing the value of D. Japanese Patent publication No. 24,069/1969, for example, discloses a telephoto lens having a forward lens group comprising three components including a positive, a negative and a positive component, of which the negative component is formed of flint glass or barium flint glass and is interposed between the two positive components (see FIG. 7). In such a combination of components, namely, components of quartzite and flint glass or barium flint glass, the value of D is reduced to about one-third or one-fourth the value as compared with the case where only ordinary glasses are used, and thus very good correction of chromatic aberration can be expected. However, problems are encountered because quartzite is more expensive than ordinary glasses and it is difficult to machine and it is difficult to obtain in a large size.

SUMMARY OF THE PRESENT INVENTION

In view of the foregoing, the present invention intends to reduce the quantity of secondary spectrum down to a fraction of that obtained by the prior art, without using any crystalline material of low dispersive power, such as quartzite or the like. However, optical glasses are much poorer in partial dispersion and dispersive power than crystalline materials such as quartzite and the like, and the value of D cannot be reduced as much as in the case of quartzite, even if phosphate crown glass or fluophosphate crown glass is used for the positive component and antimony flint glass is used to reduce the secondary spectrum, or lanthanum glass having similar properties is used for the negative component so as to accomplish an achromatism for two lines. In these cases, however, by adding a third positive component formed of a glass having a value of $\mu_g$ equivalent to the negative component and having a smaller absolute value of $k$ than that of the negative component, and increasing the negative power of the negative component so as to negate the power of the additional positive component, the composite lens comprising the negative component and the third positive component and having a negative focal length could be made to show very little variation in the value of $\nu_g$ and to show an apparent value of $k$ nearly equivalent to that of the first positive component formed of phosphate crown glass or fluophosphoric acid crown glass, thereby reducing the apparent value of D. This means that in equation 1 the magnitude of the value of $k$ is reversed between the negative component and the additional or third positive component, so that the symbol (positive or negative) of D is reversed to cause a secondary spectrum of the opposite symbol, thus resulting in an optical system having a reduced quantity of secondary spectrum.

Moreover, at the same time, the initially established achromatism for two wavelengths is maintained as it is, and when the combined value of $k$ of the negative and the third positive component becomes equal to the value of $k$ of the first component, there is established an achromatism for three wavelengths and further, in an extreme case, the symbol of the secondary spectrum is reversed. Generally, by using $n$ types of different glasses to make n components and by suitably determining the powers of the respective components, it will be proved that achromatism for $n$ different wavelengths can be established.

In an ordinary optical system, however, an achromatism for three wavelengths, effected in the vicinity of $d$, $g$ and $c$ or $d$, F and $c$ would be sufficient because the other wavelengths do not have a great difference therefrom. For this purpose, at least three components formed of at least three different glasses are required.

As the result of experiments carried out on various combinations of these three different glasses, it has been found that the combination of phosphate crown glass or fluophosphate crown glass of low dispersive power for the positive components and lanthanum glass or antimony glass for the negative component of barium flint glass, may provide a good result. This is due to the fact that phosphate crown glass and fluophosphate crown glass each have a low dispersive power, that the absolute value of $k$ of lanthanum or antimony glass used for the negative component is relatively great, and that barium flint glass has a value of $\nu_D$ nearly equal to that of lanthanum or antimony glass and has an absolute value of $k$ lower than that of lanthanum or antimony glass.

The present invention is based on the concept described heretofore, and embodiments thereof shown and described hereinafter are applications of such concept to the forward lens group of a telephoto lens which is useful as a long-focus lens for photography.

The optical system of the present invention constitutes an objective lens whose forward lens group comprises three to five components, of which at least two are convergent and at least one is divergent. At least one of these components is a positive one formed of phosphate crown glass or fluophosphate crown glass, at least one of them is a positive component formed of barium flint glass, and at least one of them is a negative component formed of lanthanum glass or antimony flint glass. Thus, correction of chromatic aberration is achieved in the forward lens group.

BRIEF DESCRIPTION OF THE DRAWINGS

FIG. 1A is a longitudinal sectional view of an optical system formed according to the present invention;

FIG. 1B is a graphical illustration of the spherical aberration of the optical system of FIG. 1A;

FIG 1C is a graphical illustration of the astigmatism of the optical system of FIG. 1A;

FIG. 1D is a graphical illustration of the distortional aberration of the optical system of FIG. 1A;

DESCRIPTION OF THE PREFERRED EMBODIMENTS

Figure 2A:
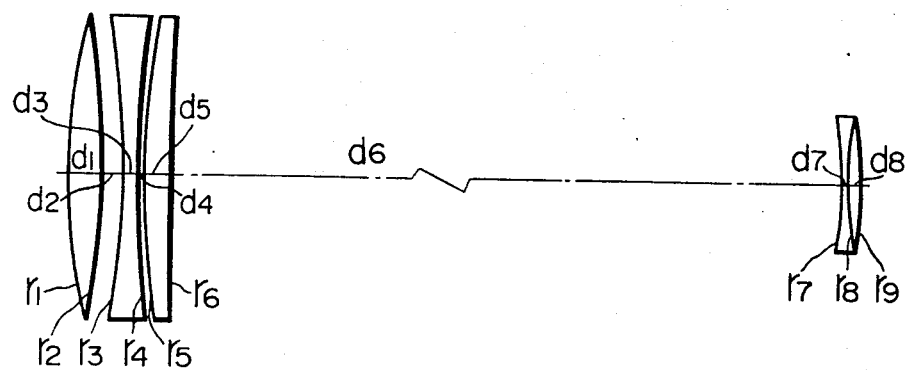
FIG. 2A is a longitudinal sectional view of an optical system formed according to a second embodiment of the present invention.
Figure 2B:
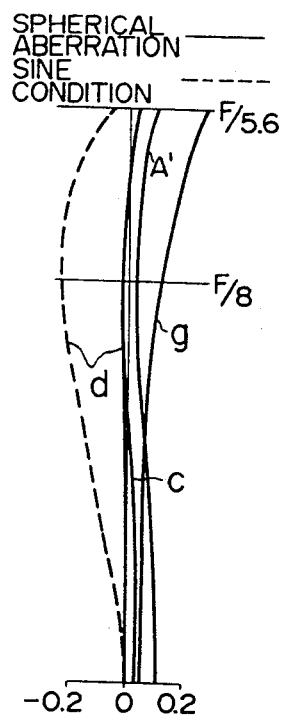
FIG. 2B is a graphical illustration of the spherical aberration of the optical system of FIG. 2A.
Figure 2C:
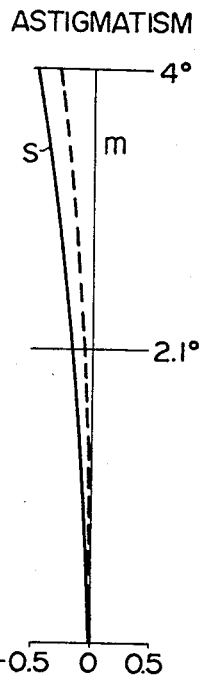
FIG. 2C is a graphical illustration of the astigmatism of the optical system of FIG. 2A.
Figure 2D:
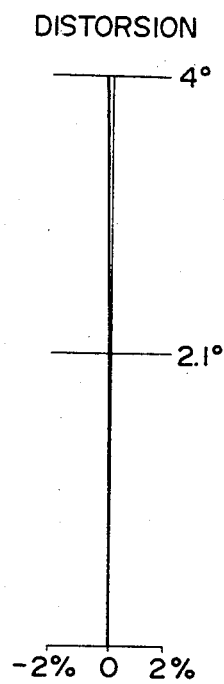
FIG. 2D is a graphical illustration of the distortional aberration of the optical system of FIG. 2A.
Figure 3A:
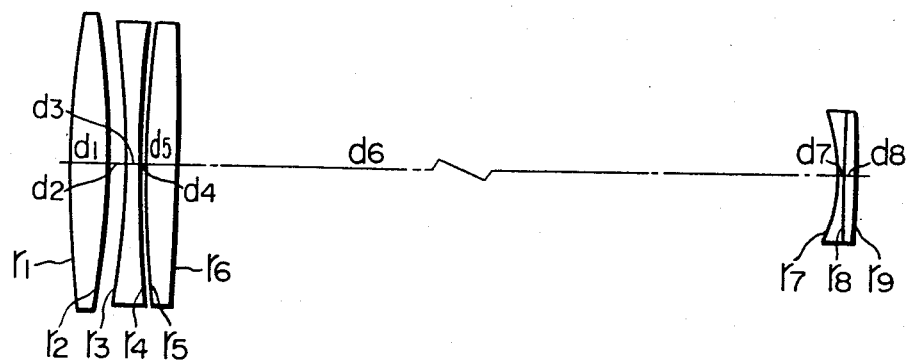
FIG. 3A is a longitudinal sectional view of an optical system formed according to a third embodiment of the present invention.
Figure 3B:
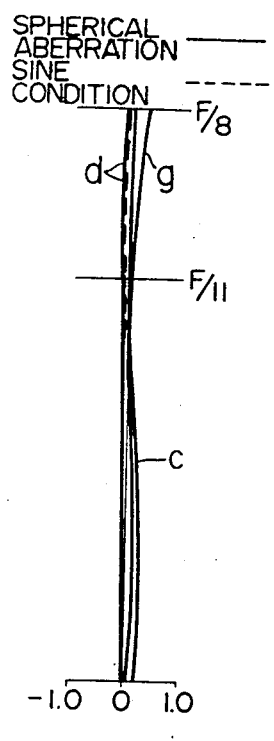
FIG. 3B is a graphical illustration of the spherical aberration of the optical system of FIG. 3A.
Figure 3C:
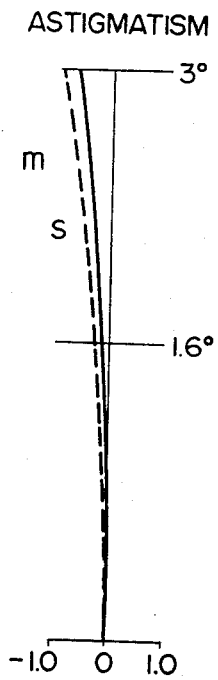
FIG. 3C is a graphical illustration of the astigmatism of the optical system of FIG. 3A.
Figure 3D:
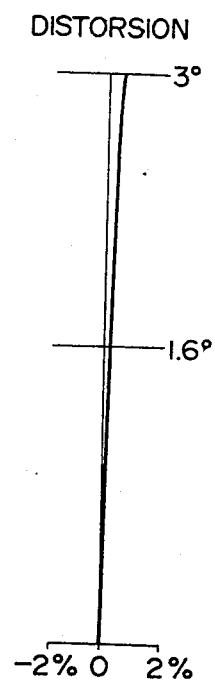
FIG. 3D is a graphical illustration of the distortional aberration of the optical system of FIG. 3A.
Figure 4A:
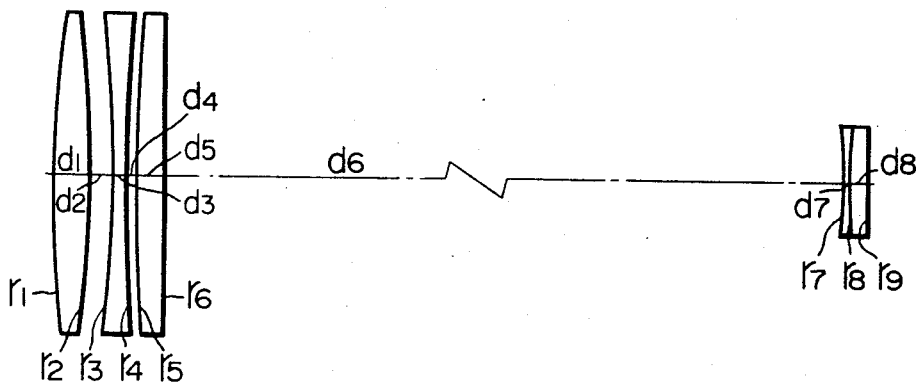
FIG. 4A is a longitudinal sectional view of an optical system formed according to a fourth embodiment of the present invention.
Figure 4B:
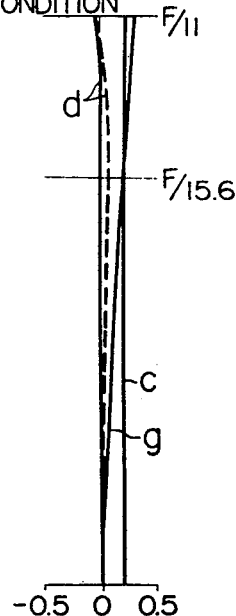
FIG. 4B is a graphical illustration of the spherical aberration of the optical system of FIG. 4A.
Figure 4C:
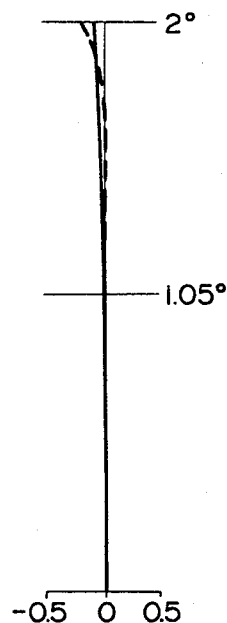
FIG. 4C is a graphical illustration of the astigmatism of the optical system of FIG. 4A.
Figure 4D:
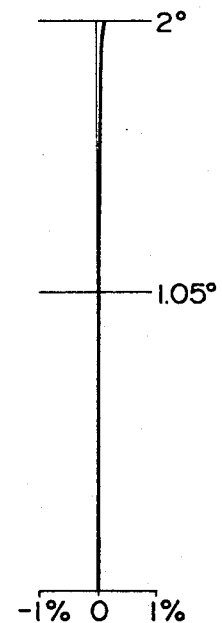
FIG. 4D is a graphical illustration of the distortional aberration of the optical system of FIG. 4A.
Figure 5A:
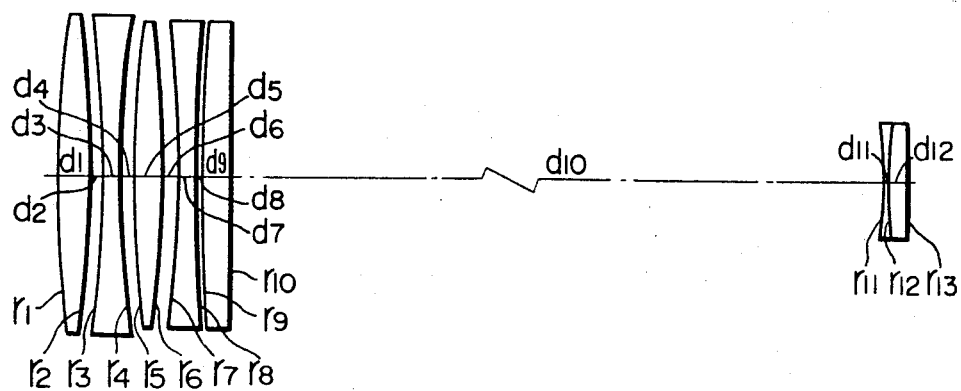
FIG. 5A is a longitudinal sectional view of an optical system formed according to a fifth embodiment of the present invention.
Figure 5B:
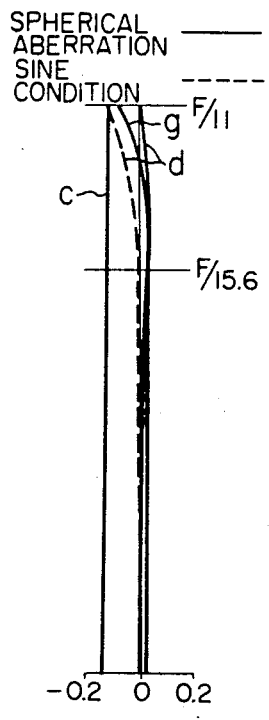
FIG. 5B is a graphical illustration of the spherical aberration of the optical system of FIG. 5A.
Figure 5C:
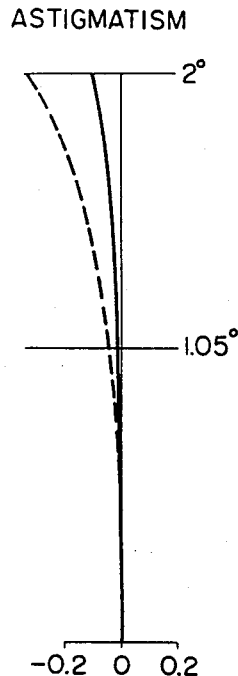
FIG. 5C is a graphical illustration of the astigmatism of the optical system of FIG. 5A.
Figure 5D:
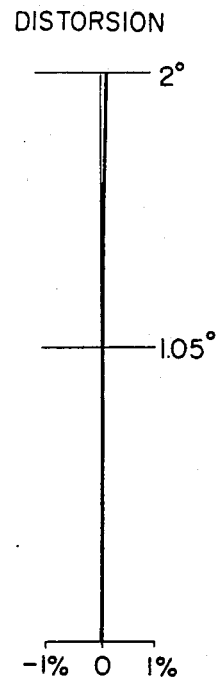
FIG. 5D is a graphical illustration of the distortional aberration of the optical system of FIG. 5A.
Figure 6:
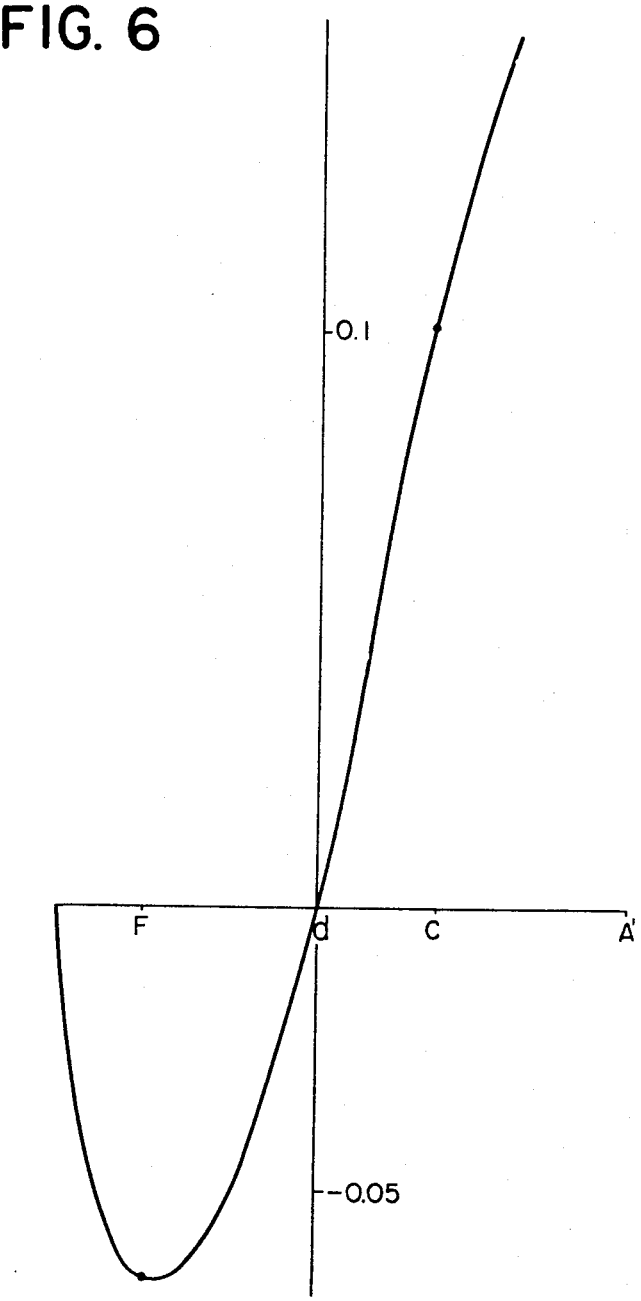
FIG. 6 is a graph illustrating the mode of achromatism in achromatic lens for two wavelengths of focal length $f = 100$ mm using two types of conventional glasses.
Figure 7:
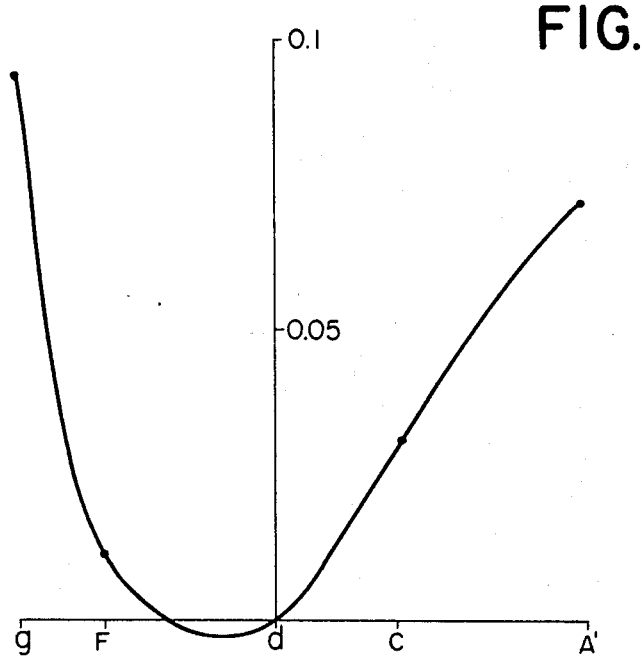
FIG. 7 is a graph illustrating the mode of achromatism at the axial image point when the focal length of the conventional telephoto lens using two components formed of quartzite is converted to $f = 100$ mm.

Referring to FIGS. 1A, 2A, 3A, 4A and 5A, there are shown, in longitudinal section, five examples of the optical system according to the present invention. As shown, the optical system constitutes an objective lens having a forward lens group, which comprises at least two convergent components and at least one divergent component. The total number of components in the forward lens group may range from three to five. In FIG. 1A (Example I), the forward lens group comprises four components, of which three are convergent and one is divergent. In FIGS. 2A, 3A and 4A (Examples II, III and IV), two convergent components and one divergent component are used. In FIG. 5A (Example V), three convergent components and two divergent components are used. In all of these various examples, at least one component in the forward lens group is a positive component formed of phosphate crown glass or fluophosphate crown glass, at least one component is a positive component formed of barium flint glass, and at least one component is a negative one formed of lanthanum glass or antimony flint glass.

Various data of the respective examples are shown in the tables below, where $r$ represents the radius of curvature of each component, $d$ the center thickness of air gap of each component, $n_d$ the refractive index of each optical glass in use, and $\nu_d$ the Abbe number of each optical glass.

Various aberrations in Examples I to V are shown in FIGS. 1B, C, D to 5B, C, D, where the curve m represents the astigmatism for meridional rays and the curve s represents the astigmatism for spherical rays.

Figure 8:
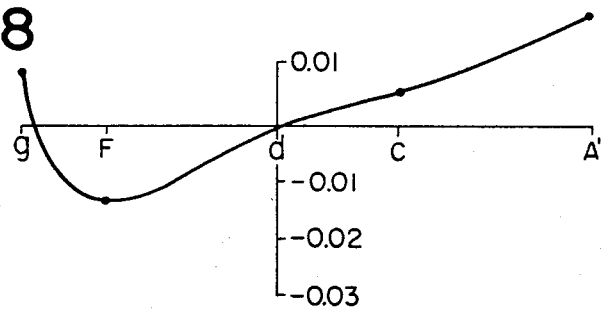
FIG. 8 is a graph illustrating the mode of achromatism at the axial image point when the focal length of the lens system of Example II of the present invention is converted to $f = 100$ mm.
Figure 9:
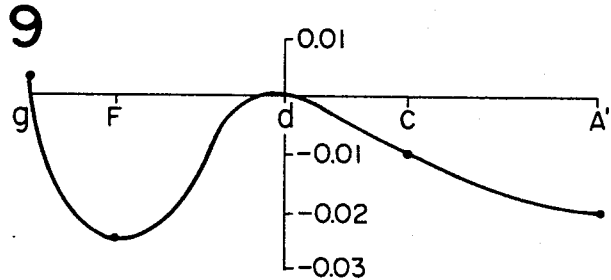
FIG. 9 is a graph illustrating the mode of achromatism at the axial image point when the focal length of the lens system of Example V of the present invention is converted to $f = 100$ mm.

The modes of achromatism of the axial image points in Examples II and V, when the focal length is converted to $f = 100$ mm, are illustrated in FIGS. 8 and 9, respectively.

Example I

Focal length $f = 300.0$; Relative aperture F/4.5;
Angle of field 8.4°

$r_1 = +106.0$    $d_1 = 11.0$    $n_d = 1.48606$
$\nu_d = 81.5$ (Fluophosphoric acid glass)
$r_2 = -151.0$    $d_2 = 4.0$
$r_3 = -144.0$    $d_3 = 3.0$    $n_d = 1.744$
$\nu_d = 44.9$ (lanthanum glass)
$r_4 = +130.0$    $d_4 = 12.0$    $n_d = 1.6393$
$\nu_d = 45.0$ (barium flint glass)
$r_5 = 650.0$    $d_5 = 1.0$
$r_6 = +95.0$    $d_6 = 7.7$    $n_d = 1.48606$
$\nu_d = 81.5$ (fluophosphoric acid glass)
$r_7 = +878.8$    $d_7 = 119.3$
$r_8 = -43.0$    $d_8 = 1.0$    $n_d = 1.62041$
$\nu_d = 60.3$
$r_9 = +150.0$    $d_9 = 3.5$    $n_d = 1.62004$
$\nu_d = 36.3$
$r_{10} = -104.82$

Example II

Focal length $f = 600.0$; Relative aperture f/5.6;
Angle of field 8°

$r_1 = +200.000$    $d_1 = 15.0$    $n_d = 1.48606$
$\nu_d = 81.5$ (fluophosphoric acid glass)
$r_2 = -277.348$    $d_2 = 6.0$
$r_3 = -277.348$    $d_3 = 6.0$    $n_d = 1.744$
$\nu_d = 44.9$ (lanthanum glass)
$r_4 = +387.299$    $d_4 = 1.5$
$r_5 = +244.820$    $d_5 = 10.0$    $n_d = 1.56965$
$\nu_d = 49.5$ (barium flint glass)
$r_6 = +4430.700$    $d_6 = 254.0$
$r_7 = -93.000$    $d_7 = 1.5$    $n_d = 1.52682$
$\nu_d = 51.1$
$r_8 = +180.000$    $d_8 = 6.0$    $n_d = 1.62374$
$\nu_d = 47.0$
$r_9 = -148.925$

Example III

Focal length $f = 800.0$; Relative aperture F/8;
Angle of field 6°.

$r_1 = +300.0$    $d_1 = 13.0$    $n_d = 1.48614$
$\nu_d = 81.5$ (fluophosphoric acid glass)
$r_2 = -430.0$    $d_2 = 7.3$
$r_3 = -382.5$    $d_3 = 7.5$    $n_d = 1.61266$
$\nu_d = 44.3$ (antimony flint glass)
$r_4 = +310.0$    $d_4 = 1.5$
$r_5 = +292.0$    $d_5 = 10.0$    $n_d = 1.56953$
$\nu_d = 49.5$ (barium flint glass)
$r_6 = -1654.4$    $d_6 = 435.0$
$r_7 = -150.0$    $d_7 = 2.0$    $n_d = 1.51885$
$\nu_d = 59.0$
$r_8 = \infty$    $d_8 = 5.0$    $n_d = 1.62399$
$\nu_d = 47.0$
$r_9 = -233.27$

Example IV

Focal length $f = 1,200$; Relative aperture F/11;
Angle of field 4°

$r_1 = +403.0$    $d_1 = 13.0$    $n_d = 1.48606$
$\nu_d = 81.5$ (Fluorophosphoric acid glass)
$r_2 = -413.0$    $d_2 = 8.0$
$r_3 = -428.0$    $d_3 = 6.0$    $n_d = 1.744$
$\nu_d = 44.9$ (lanthanum glass)
$r_4 = +1168.1$    $d_4 = 2.0$
$r_5 = +550.0$    $d_5 = 10.0$    $n_d = 1.56965$
$\nu_d = 49.5$ (barium flint glass)
$r_6 = -6230.7$    $d_6 = 575.0$
$r_7 = -190.0$    $d_7 = 2.0$    $n_d = 1.5168$
$\nu_d = 64.2$
$r_8 = +430.0$    $d_8 = 7.0$    $n_d = 1.62374$
$\nu_d = 47.0$
$r_9 = -449.9$

Example V

Focal length $f = 1,200$; Relative aperture F/11;
Angle of field 4°

$r_1 = +310.0$    $d_1 = 11.0$    $n_d = 1.61405$
$\nu_d = 55.1$ (bibarium flint glass)
$r_2 = -525.0$    $d_2 = 5.0$
$r_3 = -630.0$    $d_3 = 7.5$    $n_d = 1.6115$
$\nu_d = 44.3$ (antimony flint glass)
$r_4 = +313.0$    $d_4 = 4.0$    $r_5 = +341.3$    $d_5 = 10.0$    $n_3 = 1.48606$
$\nu_d = 81.5$ (fluophosphoric acid glass
$r_6 = -557.0$    $d_6 = 7.0$
$r_7 = -413.0$    $d_7 = 7.5$    $n_d = 1.713$
$\nu_d = 53.9$ (lanthanum glass)
$r_8 = +814.0$    $d_8 = 1.0$
$r_9 = +700.0$    $d_9 = 10.0$    $n_d = 1.62374$
$\nu_d = 47.0$ (barium flint glass)
$r_{10} = -2386.1$    $d_{10} = 533.0$
$r_{11} = -190.0$    $d_{11} = 2.0$    $n_d = 1.5168$
$\nu_d = 64.2$
$r_{12} = +310.0$    $d_{12} = 7.0$    $n_d = 1.62374$
$\nu_d = 47.0$
$r_{13} = -472.83$ Although the invention has been shown and described as applied to a telephoto lens, it is to be understood that the present invention may also be applicable to the objective lens in a telescope, microscope, etc.

I claim:

1. In a telephoto lens system including a forward achromatic objective lens group and a rear group, said forward group comprising at least three components of which at least two are convergent and at least one is divergent, at least one of said convergent components being formed of glass selected from the group consisting of fluophosphoric acid glass and phosphoric acid glass, at least one of the other convergent components being formed of barium flint glass, said divergent component being formed of glass selected from the group consisting of lanthanum glass and antimony flint glass, said rear group being spaced a substantial distance from said forward group.

2. An achromatic objective lens as defined in claim 1, wherein said components have the following characteristics;

Focal length $f = 300.0$; Relative aperture F/4.5;
Angle of field 8.4°

$r_1 = +106.0$    $d_1 = 11.0$    $n_d = 1.48606$
$\nu_d = 81.5$ fluophosphoric acid glass
$r_2 = -151.0$    $d_2 = 4.0$
$r_3 = -144.0$    $d_3 = 3.0$    $n_d = 1.744$
$\nu_d = 44.9$ lanthanum glass
$r_4 = +130.0$    $d_4 = 12.0$    $n_d = 1.6393$
$\nu_d = 45.0$ barium flint glass
$r_5 = +650.0$    $d_5 = 1.0$
$r_6 = +95.0$    $d_6 = 7.7$    $n_d = 1.48606$
$\nu_d = 81.5$ fluophosphoric acid glass
$r_7 = +878.8$    $d_7 = 119.3$
$r_8 = -43.0$    $d_8 = 1.0$    $n_d = 1.62041$
$\nu_d = 60.3$
$r_9 = +150.0$    $d_9 = 3.5$    $n_d = 1.62004$
$\nu_d = 36.3$
$r_{10} = -104.82$ wherein $r$ represents the radius of curvature of each component, $d$ the center thickness or air gap of each component,
$n_d$ the refractive index of each glass for Helium $d$-line of spectrum, and
$\nu_d$ the Abbe's number of each glass for Helium $d$-line of spectrum.

3. An achromatic objective lens as defined in claim 1, wherein said components have the following characteristics:

focal length $f=600.0$; Relative aperture F/5.6
Angle of field 8°.

$r_1 = +200.000 \quad d_1 = 15.0 \quad n_d=1.48606$
$\nu_d=81.5$ fluophosphoric acid glass
$r_2 = -277.348 \quad d_2 = 6.0$
$r_3 = -277.348 \quad d_3 = 6.0 \quad n_d=1.744$
$\nu_d=44.9$ lanthanum glass
$r_4 = +387.299 \quad d_4 = 1.5$
$r_5 = +224.820 \quad d_5 = 10.0 \quad n_d=1.56965$
$\nu_d=49.5$ barium flint glass
$r_6 = +4430.700 \quad d_6 = 254.0$
$r_7 = -93.000 \quad d_7 = 1.5 \quad n_d=1.52682$
$\nu_d=51.1$
$r_8 = +180.000 \quad d_8 = 6.0 \quad n_d=1.62374$
$\nu_d=47.0$
$r_9 = -148.925$ wherein $r$ represents the radius of curvature of each component,
$d$ the center thickness or air gap of each component,
$n_d$ the refractive index of each glass for Helium $d$-line of spectrum, and
$\nu_d$ the Abbe's number of each glass for Helium $d$-line of spectrum.

4. An achromatic objective lens as defined in claim 1, wherein said components have the following characteristics:

Focal length $f=800.0$; Relative aperture F/8;
Angle of field 6°

$r_1 = +300.0 \quad d_1 = 13.0 \quad n_d=1.48614$
$\nu_d=81.5$ fluophosphoric acid glass
$r_2 = -430.0 \quad d_2 = 7.3$
$r_3 = -382.5 \quad d_3 = 7.5 \quad n_d=1.61266$
$\nu_d=44.3$ antimony flint glass
$r_4 = +310.0 \quad d_4 = 1.5$
$r_5 = +292.0 \quad d_5 = 10.0 \quad n_d=1.56953$
$\nu_d=49.5$ barium flint glass
$r_6 = -1654.4 \quad d_6 = 435.0$
$r_7 = -150.0 \quad d_7 = 2.0 \quad n_d=1.51885$
$\nu_d=59.0$
$r_8 = \infty \quad d_8 = 5.0 \quad n_d=1.62399$
$\nu_d=47.0$
$r_9 = -233.27$ wherein $r$ represents the radius of curvature of each component,
$d$ the center thickness or air gap of each component,
$n_d$ the refractive index of each glass for Helium $d$-line of spectrum, and
$\nu_d$ the Abbe's number of each glass for Helium $d$-line of spectrum.

5. An achromatic objective lens as defined in claim 1, wherein said components have the following characteristics:

focal length $f=1,200$; Relative aperture F/11;
Angle of field 4°

$r_1 = +403.0 \quad d_1 = 13.0 \quad n_d=1.48606$
$\nu_d=81.5$ Fluophosphoric acid glass
$r_2 = -413.0 \quad d_2 = 8.0$
$r_3 = -428.0 \quad d_3 = 6.0 \quad n_d=1.744$
$\nu_d=44.9$ lanthanum glass
$r_4 = +1168.1 \quad d_4 = 2.0$
$r_5 = +550.0 \quad d_5 = 10.0 \quad n_d=1.56965$
$\nu_d=49.5$ barium flint glass
$r_6 = -6230.7 \quad d_6 = 575.0$
$r_7 = -190.0 \quad d_7 = 2.0 \quad n_d=1.5168$
$\nu_d=64.2$
$r_8 = +430.0 \quad d_8 = 7.0 \quad n_d=1.62374$
$\nu_d=47.0$
$r_9 = -449.9$ wherein $r$ represents the radius of curvature of each component,
$d$ the center thickness or air gap of each component,
$n_d$ the refractive index of each glass for Helium $d$-line of spectrum, and
$\nu_d$ the Abbe's number of each glass for Helium $d$-line of spectrum.

6. An achromatic objective lens as defined in claim 1, wherein said components have the following characteristics:

Focal length $f=1,200$; Relative aperture F/11;
Angle of field 4°.

$r_1 = +310.0 \quad d_1 = 11.0 \quad n_d=1.61405$
$\nu_d=55.1$ bibarium flint glass
$r_2 = -525.0 \quad d_2 = 5.0$
$r_3 = -630.0 \quad d_3 = 7.5 \quad n_d=1.6115$
$\nu_d=44.3$ antimony flint glass
$r_4 = +313.0 \quad d_4 = 4.0$
$r_5 = +341.3 \quad d_5 = 10.0 \quad n_d=1.48606$
$\nu_d=81.5$ fluophosphoric acid glass
$r_6 = -557.0 \quad d_6 = 7.0$
$r_7 = -413.0 \quad d_7 = 7.5 \quad n_d=1.713$
$\nu_d=53.9$ lanthanum glass
$r_8 = +814.0 \quad d_8 = 1.0$
$r_9 = +700.0 \quad d_9 = 10.0 \quad n_d=1.62374$
$\nu_d=47.0$ barium flint glass
$r_{10} = -2386.1 \quad d_{10} = 533.0$
$r_{11} = -190.0 \quad d_{11} = 2.0 \quad n_d=1.5168$
$\nu_d=64.2$
$r_{12} = +310.0 \quad d_{12} = 7.0 \quad n_d=1.62374$
$\nu_d=47.0$
$r_{13} = -472.83$ wherein $r$ represents the radius of curvature of each component,
$d$ the center thickness or air gap of each components,
$n_d$ the refractive index of each glass for Helium $d$-line of spectrum, and
$\nu_d$ the Abbe's number of each glass for Helium $d$-line of spectrum.

* * * * *

UNITED STATES PATENT OFFICE
CERTIFICATE OF CORRECTION

Patent No. 3,774,991　　　　　　　Dated November 27, 1973

Inventor(s) YOSHIYUKI SHIMIZU

It is certified that error appears in the above-identified patent and that said Letters Patent are hereby corrected as shown below:

Column 1, line 14, change "$\mu c$ and c-line" to -- $\mu c$ for c-line --;
　　line 16, change "$\Delta f_c = f_c - f_d = -[(k_1 - f_2)/(\nu_{g1} - \nu_{g2})]f_d = Df_d$" to -- $\Delta f_c = f_c - f_d = -[(k_1 - k_2)/(\nu_{g1} - \nu_{g2})]f_d = -Df_d$ --.

Column 2, line 33, change "value of $\mu_g$" to -- value of $\nu_g$ --.
Column 5, between lines 6 and 7, beneath $r_2$ and above $r_3$, insert -- $\nu_d$ --; line 29, change "$r_5 = +244.820$" to -- $r_5 = +224.820$ --; line 58, change "(Fluorophosphoric" to -- (Fluophosphoric --.
Column 6, line 12, delete "$r_5 =+ 341.3$　$d_5= 10.0$　$n_3$";
　　line 13, before "=1.48606", insert -- $r_5 =+ 341.3$　$d_5= 10.0$　$n_d$ --.

Signed and sealed this 30th day of July 1974.

(SEAL)
Attest:

McCOY M. GIBSON, JR.　　　　　　　C. MARSHALL DANN
Attesting Officer　　　　　　　　Commissioner of Patents